United States Patent
Suryanarayana et al.

(10) Patent No.: US 9,979,273 B2
(45) Date of Patent: May 22, 2018

(54) RESONANT CONVERTERS WITH VARIABLE INDUCTOR

(71) Applicant: ABB Technology Ltd., Zurich (CH)

(72) Inventors: Harish Suryanarayana, Raleigh, NC (US); Jiaqi Liang, Cary, NC (US); Jukka-Pekka Kittila, Helsinki (FI); Wen Ouyang, Apex, NC (US)

(73) Assignee: ABB Schweiz AG, Baden (CH)

( * ) Notice: Subject to any disclaimer, the term of this patent is extended or adjusted under 35 U.S.C. 154(b) by 24 days.

(21) Appl. No.: 15/159,159

(22) Filed: May 19, 2016

(65) Prior Publication Data
US 2017/0338730 A1    Nov. 23, 2017

(51) Int. Cl.
*H01F 27/28*    (2006.01)
*H01F 21/08*    (2006.01)
(Continued)

(52) U.S. Cl.
CPC .............. *H02M 1/088* (2013.01); *H01F 3/14* (2013.01); *H01F 27/24* (2013.01); *H01F 27/28* (2013.01);
(Continued)

(58) Field of Classification Search
CPC . H02M 2001/0058; H02M 2001/0064; H02M 1/16; H01F 2003/103;
(Continued)

(56) References Cited

U.S. PATENT DOCUMENTS

| | | |
|---|---|---|
| 2,996,695 A | 8/1961 | Dickinson |
| 3,735,305 A | 5/1973 | Sinnott et al. |

(Continued)

OTHER PUBLICATIONS

Y. Li, "Unified Zero Current Transition Techniques for High Power Three Phase PWM Inverter," PhD Dissertation, Polytechnic Institute and State University, 2002, 305 pgs., Blacksburg, Virginia. Virginia.

(Continued)

*Primary Examiner* — Jeffrey Gblende
*Assistant Examiner* — David A. Singh
(74) *Attorney, Agent, or Firm* — Taft Stettinius & Hollister LLP

(57) ABSTRACT

Unique systems, methods, techniques and apparatuses for a ZVT ZCT resonant converter with a variable resonant tank are disclosed. One exemplary embodiment is a system comprising a bidirectional resonant converter comprising an input/output terminal, a switching device coupled with the input/output terminal, a resonant circuit coupled with the switching device and including a variable inductor, an output/input terminal coupled with the resonant circuit, and a DC biasing circuit operatively coupled with the variable inductor. The variable inductor comprises a toroidal core, a first winding wound around the toroidal core and coupled with the switching device and the output/input terminal, a second core structured to overlap a portion of the toroidal core, and a second winding wound around the second core and coupled with the DC biasing circuit. The DC biasing circuit is controllable to vary the inductance of the variable inductor by saturating a portion of the toroidal core.

12 Claims, 4 Drawing Sheets

(51) Int. Cl.

| | | |
|---|---|---|
| *H02M 3/335* | (2006.01) | |
| *H02J 50/12* | (2016.01) | |
| *H02M 1/088* | (2006.01) | |
| *H01F 27/24* | (2006.01) | |
| *H02M 7/537* | (2006.01) | |
| *H01F 3/14* | (2006.01) | |
| *H01F 29/14* | (2006.01) | |
| *H02M 1/00* | (2006.01) | |

(52) U.S. Cl.
CPC ......... *H01F 27/2895* (2013.01); *H01F 29/14* (2013.01); *H02J 50/12* (2016.02); *H02M 3/33507* (2013.01); *H02M 3/33584* (2013.01); *H02M 7/537* (2013.01); *H01F 21/08* (2013.01); *H01F 2029/143* (2013.01); *H02M 2001/0003* (2013.01)

(58) Field of Classification Search
CPC ........ H01F 13/003; H01F 21/02; H01F 21/08; H01F 2029/143; H01F 17/062; H01F 27/2895; H01F 29/14; H01F 30/16; H01F 2038/0305; H02J 50/10; H02J 50/12
See application file for complete search history.

(56) References Cited

U.S. PATENT DOCUMENTS

| | | | |
|---|---|---|---|
| 4,829,232 A | | 5/1989 | Erickson, Jr. |
| 5,293,308 A | * | 3/1994 | Boys ................ H02J 5/005 363/37 |
| 5,684,678 A | * | 11/1997 | Barrett ............... H01F 21/08 363/17 |
| 6,337,801 B2 | | 1/2002 | Li et al. |
| 6,621,718 B1 | | 9/2003 | Malik et al. |
| 7,193,495 B2 | | 3/2007 | Haugs et al. |
| 7,518,267 B2 | | 4/2009 | Baarman |
| 7,889,026 B2 | | 2/2011 | Parsche et al. |
| 8,050,068 B2 | | 11/2011 | Hussmann et al. |
| 2001/0033507 A1 | | 10/2001 | Li et al. |
| 2005/0012487 A1 | * | 1/2005 | Skeist ................ H02P 9/007 318/727 |
| 2005/0286270 A1 | * | 12/2005 | Petkov ................ H01F 27/38 363/17 |
| 2009/0174501 A1 | | 7/2009 | Parsche et al. |
| 2011/0299309 A1 | * | 12/2011 | Chen ............... H02M 3/33569 363/37 |
| 2015/0029758 A1 | | 1/2015 | Jacobson et al. |
| 2015/0051750 A1 | | 2/2015 | Parsche et al. |
| 2015/0124487 A1 | * | 5/2015 | Fu .................. H02M 3/33569 363/17 |
| 2015/0371756 A1 | | 12/2015 | Sturcken et al. |

OTHER PUBLICATIONS

H. Mao et al., "Improved Zero-Current Transition Converters for High Power Applications," Industry Applications, IEEE Transactions, Sep./Oct. 1997, 8 pgs., vol. 33, No. 5, Blacksburg, Virginia.

H. Fan et al., "A Novel Phase-Shift Bidirectional DC-DC Converter with an Extended High-Efficiency Range for 20kVA Solid State Transformer," Center for Advanced Power Systems, Florida State University, Sep. 12-16, 2010, 7 pgs., Tallahassee, Florida.

D. Medini et al., "A Current-Controlled Variable-Inductor for High Frequency Resonant Power Circuits," Applied Power Electronics Conference and Exposition, Feb. 13, 1994, 7 pgs., Israel.

Search Report and Written Opinion PCT Appln. No. PCT/US17/33298, dated Sep. 28, 2017, 12 pgs.

* cited by examiner

RESONANT CONVERTERS WITH VARIABLE INDUCTOR

BACKGROUND

The present disclosure relates generally to resonant converters. Resonant converters, including zero-voltage transition (ZVT) pulse width modulation (PWM) converters and zero-current transition converters (ZCT) PWM converters offer a number of benefits including, for example, allowing high switching frequencies, reducing electromagnetic noise emission, and allowing use of smaller passive components. Existing resonant converters suffer from a number of shortcomings and disadvantages. There remain unmet needs including increasing resonance operation range, reducing switching losses, and decreasing stress on converter components. For example, when resonant converters operate outside their resonant operating range, the converter switching losses increase and the stress on the switches increase. There is a significant need for the unique apparatuses, methods, systems and techniques disclosed herein.

SUMMARY

For the purposes of clearly, concisely and exactly describing non-limiting exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the present disclosure is thereby created, and that the present disclosure includes and protects such alterations, modifications, and further applications of the exemplary embodiments as would occur to one skilled in the art with the benefit of the present disclosure.

Exemplary embodiments include unique systems, methods, techniques and apparatuses for a zero-voltage transition zero-current transition resonant converter with a variable resonant tank. Further embodiments, forms, objects, features, advantages, aspects and benefits of the disclosure shall become apparent from the following description and drawings.

DETAILED DESCRIPTION OF ILLUSTRATIVE EMBODIMENTS

Figure 1:
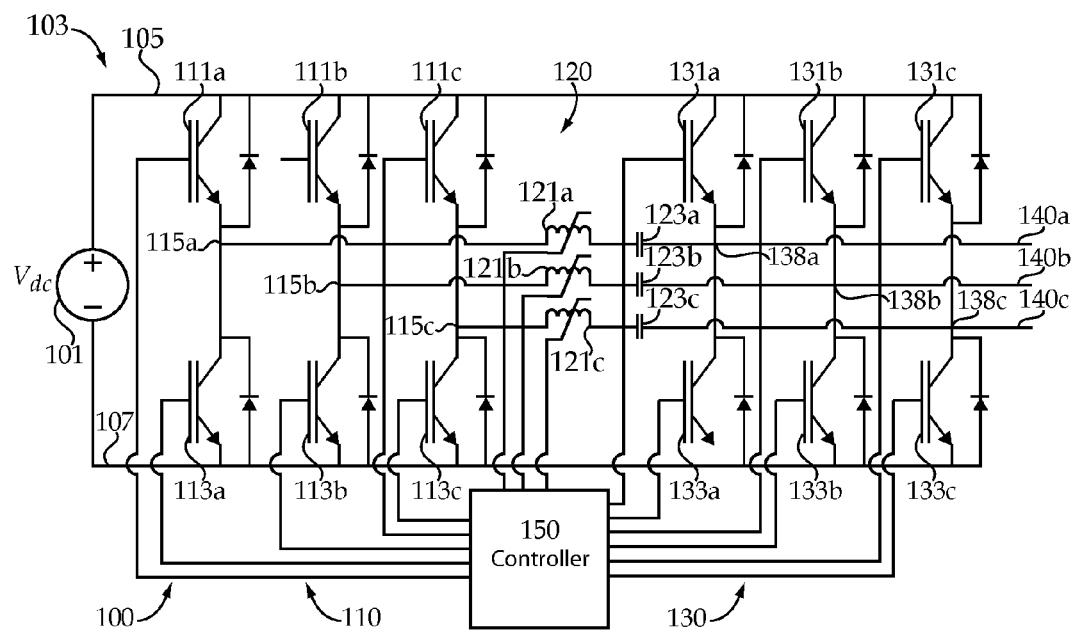
FIG. 1 illustrates an exemplary resonant converter.

With reference to FIG. 1 there is illustrated an exemplary resonant converter 100. It shall be appreciated that converter 100 may be implemented in a variety of applications, including electric vehicles, hybrid vehicles, motor drives, and medium voltage power distribution to name but a few examples. In the illustrated embodiment, converter 100 is structured to convert DC power to three phase AC power. In other embodiments, converter 100 is structured to convert DC power at one voltage level to DC power at a second voltage level or DC power to single phase AC power.

Converter 100 is coupled to a DC power supply 101 having a positive pole and a negative pole. Specifically, the power supply 101 is coupled to a DC bus 103 having a positive rail 105 and a negative rail 107. The positive rail 105 of DC bus 103 is coupled to the positive pole of the DC power supply 101 and the negative rail 107 of the DC bus 103 is coupled to the negative pole of the DC power supply 101. The voltage difference between the positive rail 105 and the negative rail 107 is $V_{dc}$. It shall be appreciated that power supply 101 may be coupled directly to DC bus 103 or may be coupled to DC bus 103 via one or more intermediate components and that the same is true of other elements described here as being coupled to or with another element unless expressly indicated to the contrary.

Converter 100 further includes an auxiliary circuit 110 having three legs corresponding to three converter phases. It shall be appreciated that other embodiments my utilize converters with a different number of legs corresponding to a different number of converter phases ranging from as few as one phase/leg to greater than three phases/legs. The first leg includes a first switching device 111*a* having a first terminal coupled to positive rail 105 and a second terminal coupled to a resonant node 115*a*. In the illustrated embodiment, switching device 111*a* is an insulated gate bipolar transistor (IGBT) having a freewheeling diode. Switching device 111*a* may be any type of semiconductor switching device. It shall be appreciated that any or all of the foregoing features of switching device 111*a* may also be present in the other switching devices disclosed herein.

The first leg of circuit 110 also includes a second switching device 113*a* having a first terminal coupled to resonant node 115*a* and a second terminal coupled to negative rail 107. The second leg includes a first switching device 111*b* having a first terminal coupled to the positive rail 105 and a second terminal coupled to a resonant node 115*b*. The second leg also includes a second switching device 113*b* having a first terminal coupled to the resonant node 115*b* and a second terminal coupled to the negative rail 107. The third leg includes a first switching device 111*c* having a first terminal coupled to positive rail 105 and a second terminal coupled to a resonant node 115*c*. The third leg also includes a second switching device 113*c* having a first terminal coupled to a resonant node 115*c* and a second terminal coupled to negative rail 107.

Converter 100 further includes a variable resonant tank 120 coupled to resonant nodes 115*a*-115*c*. Specifically, tank 120 includes a series-coupled first variable inductor 121*a* and a first capacitor 123*a* coupled to resonant node 115*a*; a series-coupled second variable inductor 121*b* and a second capacitor 123*b* coupled to resonant node 115*b*; and a series-coupled third variable inductor 121*c* and a third capacitor 123*c* coupled to resonant node 115*c*. In certain embodiments, capacitors 123*a*-123*c* are variable capacitors. As discussed in more detail below, variable inductors 121*a*-121*c* include a toroidal core; a first winding wound around the toroidal core and coupled with the auxiliary circuit 110 and a primary circuit 130; a second core structured to overlap a portion of the toroidal core; and a second winding wound, also known as a DC biasing coil, around the second core and coupled with a controller 150, also known as a DC biasing circuit.

The primary circuit 110 includes three legs. The first leg includes a first switching device 131*a* having a first terminal coupled to positive rail 105 and a second terminal coupled to an output node 138*a*. The first leg also includes a second switching device 133*a* having a first terminal coupled to output node 138*a* and negative rail 107. The second leg includes a first switching device 131*b* having a first terminal coupled to the positive rail 105 and a second terminal coupled to an output node 138*b*. The second leg also includes a second switching device 133*b* having a first terminal coupled to the output node 138*b* and a second terminal coupled to the negative rail 107. The third leg includes a first switching device 131*c* having a first terminal coupled to the positive rail 105 and a second terminal coupled to an output node 138*c*. The third leg also includes a second switching device 133*c* having a first terminal coupled to the output node 138*c* and a second terminal coupled to the negative rail 107.

Output node 138*a* is coupled to capacitor 123*a* of resonant tank 120 and an output line 140*a*; output node 138*b* is coupled to capacitor 123*b* and an output line 140*b*; and output node 138*c* is coupled to capacitor 123*c* and an output line 140*c*. Output nodes 138*a*-138*c* are coupled to a load structured to receive three phase AC power.

Controller 150 is coupled to switching devices 111*a*-111*c*, 113*a*-113*c*, 131*a*-131*c*, and 133*a*-133*c* as well as variable inductors 121*a*-121*c*. Controller 150 is structured to operate the switching devices by transmitting activation signals to each switching device. Controller 150 is also structured to vary the inductance value of the variable inductor by saturating a portion of the toroidal core with magnetic flux. By saturating a portion of the toroidal core, the inductance of the variable inductor is reduced. Controller 150 saturates the toroidal core by providing DC power to the DC bias coil of the variable inductor. Controller 150 may be one controller or a plurality of controllers. It shall be appreciated that any or all of the foregoing features of converter 100 may also be present in the other converters disclosed herein.

Figure 2:
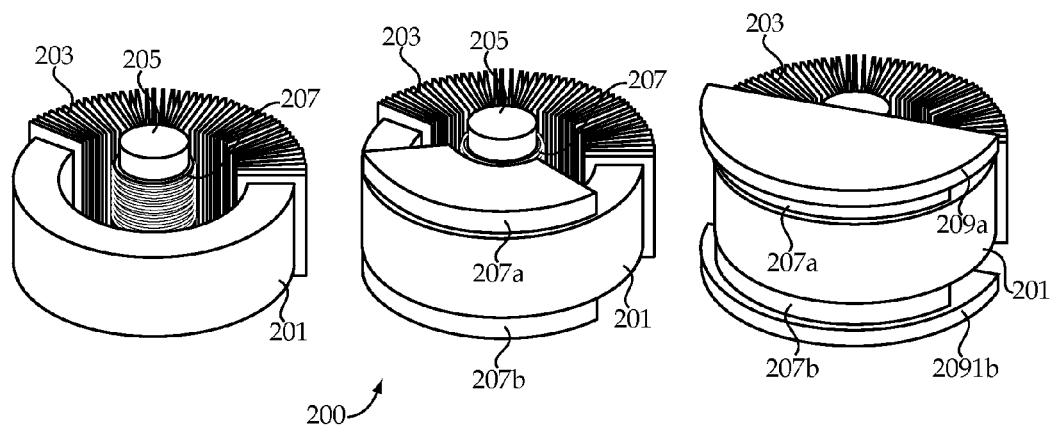
FIGS. 2-5 illustrate exemplary variable inductors.

With reference to FIG. 2 there is illustrated an exemplary variable inductor 200. In one embodiment, inductor 200 is one of the variable inductors 121*a*-121*c* of converter 100 in FIG. 1. Inductor 200 includes a toroid 201 having an external surface. In the illustrated embodiment, the toroid is structured as a torus with a circular cross section. In other embodiments, toroid 201 is a hollow square section ring with a rectangular cross section. A first winding 203 is wound around a portion of the external surface of the toroid 201. One end of winding 203 is coupled to an AC power source, and the other end of the winding 203 is coupled to an output node. As AC power flow through winding 203, AC flux is generated in a toroidal flux path. Toroid 201 may include an air gap positioned such that the air gap and the first winding 203 overlap along a portion of the toroid 201. A core 205 is located in the center of the toroid 203 such that the toroid 201 encircles the core 205 and a second winding 207, also known as a DC bias coil, is wound around core 205. In certain embodiments, the core 205 may include an air gap. A DC power source is coupled to core 205. When DC power flows through winding 207, a DC flux is generated along a DC flux path perpendicular to the AC flux path. The DC flux saturates a portion of the AC flux path. Since the DC flux path has no air gap and the AC flux path has an air gap, saturating the toroid 201 using the second winding 207 requires less power, whereas energy can be stored in the air gap in the AC flux path, leading to reduced inductor size.

In the illustrated embodiment, core 205 includes a cylindrical portion. In other embodiments, the core 205 includes a rectangular portion or a square portion, to name a few examples. The core may also include two plates 207*a* and 207*b* placed on a portion of the external surface of the toroid 201 and an additional two plates 209*a* and 209*b* are placed on plates 207*a* and 207*b*, respectively, such that plates 209*a* and 209*b* are in contact with the cylindrical core portion 205.

A first flux path through the toroid 201 for the first winding 203 is generally toroidal and a second flux path through the toroid 201 for the second winding 207 is perpendicular to the first flux path.

In certain embodiments, inductor 200 includes a second core structured to overlap a second portion of the toroid 201, and a second magnetic winding wound around the second core and coupled with a second DC biasing circuit, the second DC biasing circuit being controllable to vary the inductance of the variable inductor by saturating a second portion of the toroid 201 with magnetic flux. The second core may have an external surface, a first end, a second end, a second magnetic winding wound around the external surface of the second cylinder, a second top plate coupled to the first end of the second cylinder and in contact with the external surface of the toroid, and a second bottom plate electrically coupled to the second end of the second cylinder and in contact with the external surface of the toroid 201.

Inductor 200 may be incorporated into a resonant converter, such as converter 100 of FIG. 1. With continuing reference to FIG. 1, controller 150 is structured to generate a current through the variable inductor 200 by operating the switches of auxiliary circuit 110; provide a current to the second winding 207 of the variable inductor so as to alter the inductance of the variable inductor 200 with the controller 150; provide power to the second terminal of one of the switching devices 131*a*-131*c* with a current and voltage substantially equal to the current and voltage of the power provided to the first terminal of the same switching device; and open the second switching device during the zero-voltage, zero-current condition. The controller 150 is additionally structured to receive voltage and load current requirements; calculate a desired resonant tank impedance using the voltage and load current requirements; and provide a current to the second winding of the variable inductor with the controller in response to the calculating the desired resonant tank impedance.

The controller 150 is structured to operate the switching devices of the auxiliary circuit 110 by opening and closing the switching device at resonant frequency so as to provide a resonant current to the output nodes 138*a*-138*c*. For each output phase, the resonant frequency is determined by the inductance value of the variable inductors 121*a*-121*c* and the capacitance of the capacitors 123*a*-123*c* using the following equation, where $f_0$ is resonant frequency, $L_x$ is inductance of the variable inductor and $C_x$ is the capacitance of the capacitor:

$$f_0 = \frac{1}{\sqrt{L_x C_x}} \tag{1}$$

For embodiments where the variable inductor 200 includes more than one core 205, the controller 150 is additionally structured to provide a current to the second magnetic winding of the variable inductor 200 in response to calculating the desired resonant tank impedance. For example, the controller 150 may use a lookup table to determine whether to provide a current through the magnetic winding. It shall be appreciated that any or all of the foregoing features of variable inductor 200 may also be present in the other variable inductors disclosed herein.

Figure 3:
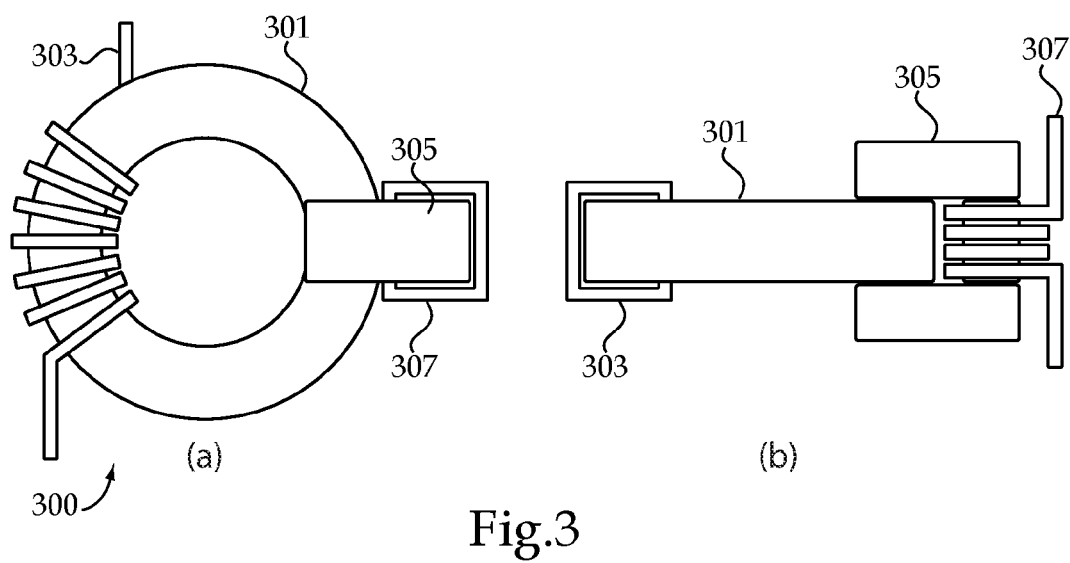

With reference to FIG. 3 there is illustrated an exemplary variable inductor 300. FIG. 3*a* is a top view of inductor 300 and FIG. 3*b* is a side view of inductor 300. Inductor 300 includes a toroid 301 having an external surface. A first winding 303 is wound around a portion of the external surface 303 of the toroid 301. A core 305 is located on the outside of the toroid 301 such that a portion of the core 305 is in contact with the external surface of the toroid 301. In the illustrated embodiment, core 305 is structured as a C-shaped structure including a portion overlapping the toroid 301, a middle portion around which a second winding 301 is wound, and a third portion overlapping the toroid 301, also known as a C-core.

Figure 4:
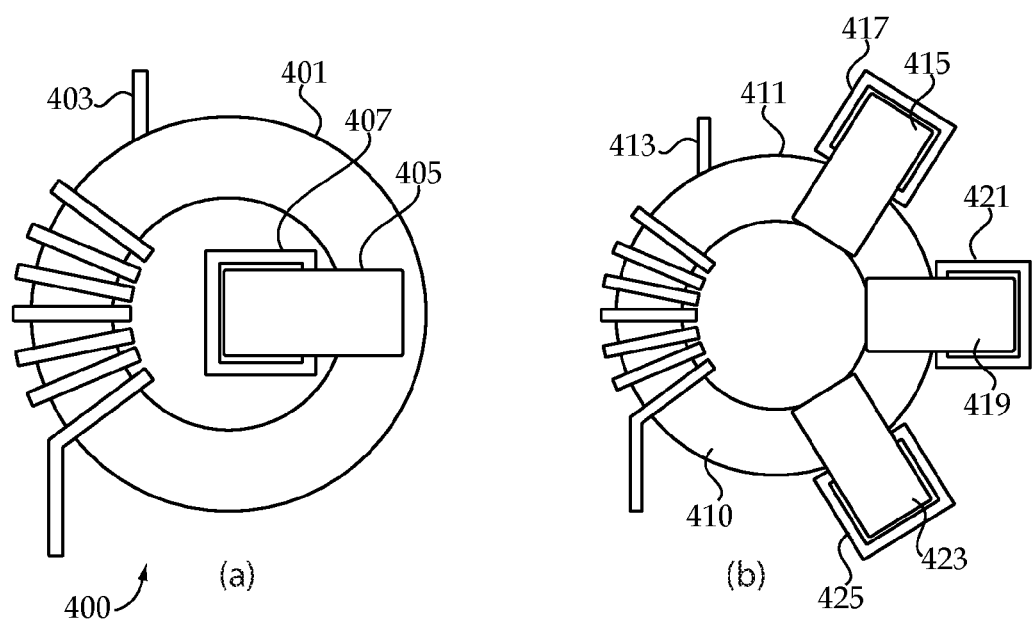

With reference to FIG. 4(a) there is illustrated an exemplary variable inductor 400 including a toroid 401 having an external surface. The inductor 400 also includes a first winding 403 wound around a portion of the external surface of the toroid 401. A C-core is located on the inside of the toroid such that a portion of the C-core 405 is in contact with the toroid 401. A second winding 407 is wound around the C-core 405.

With reference to FIG. 4(b) there is illustrated another exemplary variable inductor 410 including a toroid 411 having an external surface. A first winding 413 is wound around a portion of the external surface of the toroid 411. A first C-core 405 is located on the outside of the toroid 411 such that C-core 415 is in contact with the toroid 411. A second winding 417 is wound around C-core 415. A second C-core 419 is located on the outside of the toroid 411 such that C-core 415 is in contact with the toroid 411. A third winding 421 is wound around C-core 415. A third C-core 423 is located on the outside of the toroid 411 such that C-core 423 is contact with the toroid 411. A fourth winding 417 is wound around C-core 415.

Figure 5:
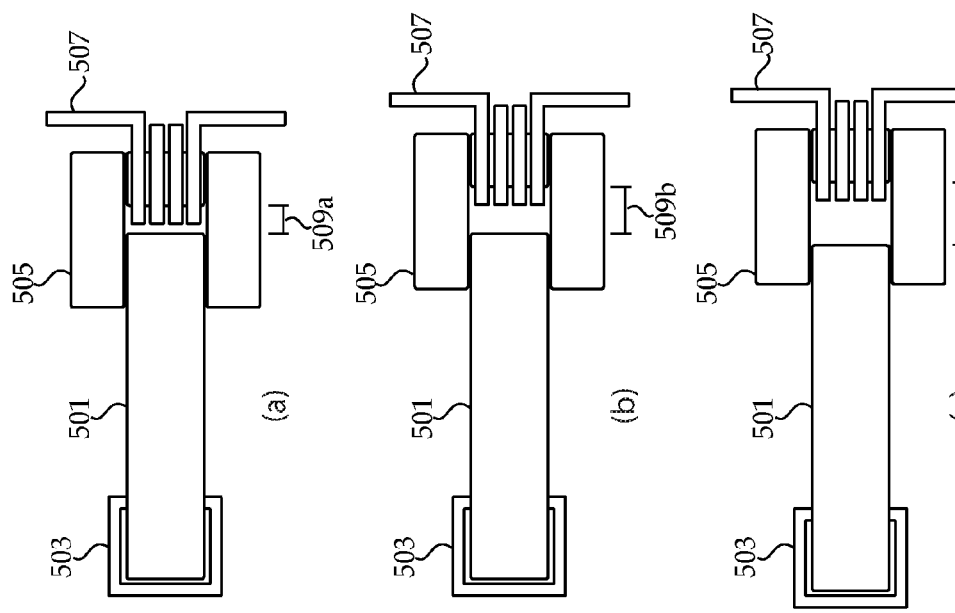

With reference to FIG. 5(a)-(c) there are side views illustrating another exemplary variable inductor 500 having a toroid 501; a first winding 503 wound around toroid 501; a C-core 505 located on the outside of the center of toroid 501; and a second winding 507 wound around C-core 505. C-core 505 may be located a varying distance 509a, 509b, or 509c from toroid 501. Distance 509a-509c may be adjusted during operation of the inductor 500 so as to vary the saturation of the AC flux path of inductor 500.

Figure 6:
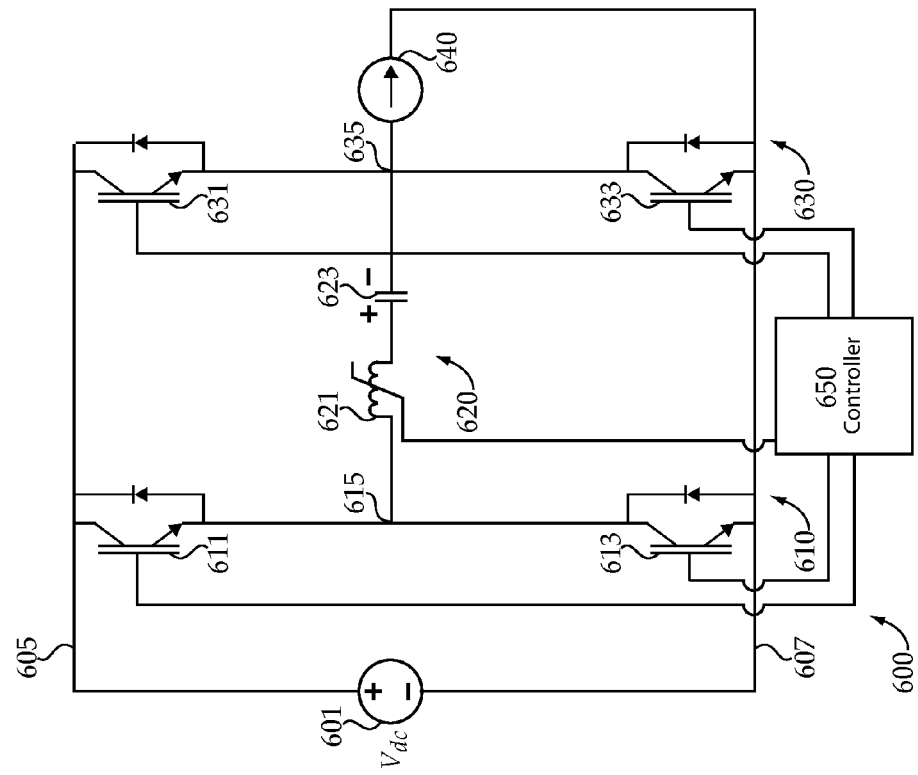
FIG. 6 illustrates another exemplary resonant converter.

With reference to FIG. 6 there is illustrated an exemplary converter 600 structured to convert DC power at a first voltage to DC power at a second voltage. Converter 600 is coupled to a DC power source 601 having a positive pole and a negative pole. Converter includes a DC bus positive rail 605 coupled to the positive pole and a DC bus negative rail 607 coupled to the negative pole. The voltage difference between positive rail 605 and negative rail 607 is $V_{dc}$. Converter 600 includes an auxiliary leg 610 having a first switching device 611 with a first terminal coupled to positive rail 605 and a second terminal coupled to a resonant node 615. Leg 610 also includes a second switching device 613 having a first terminal coupled to the resonant node 615 and a second terminal coupled to the negative rail 607.

Converter 600 also includes a resonant tank 620 having a variable inductor 621 and a capacitor 623 coupled in series to resonant node 615. Converter 600 includes a primary leg 630 having a first switching device 631 with a first terminal coupled to positive rail 605 and a second terminal coupled to an output node 635. Leg 630 also includes a second switching device 633 having a first terminal coupled to the output node 635 and a second terminal coupled to negative rail 607. Output node 635 is coupled to resonant tank 620 and a load 640.

Converter 600 further includes controller 650 coupled to switching devices 611, 613, 631, and 633, as well as variable inductor 621. Controller 150 is structured to operate the switching devices by transmitting activation signals. Controller 150 is structured to vary the inductance value of the variable inductor 621 by transmitting DC power to the variable inductor 621.

Figure 7:
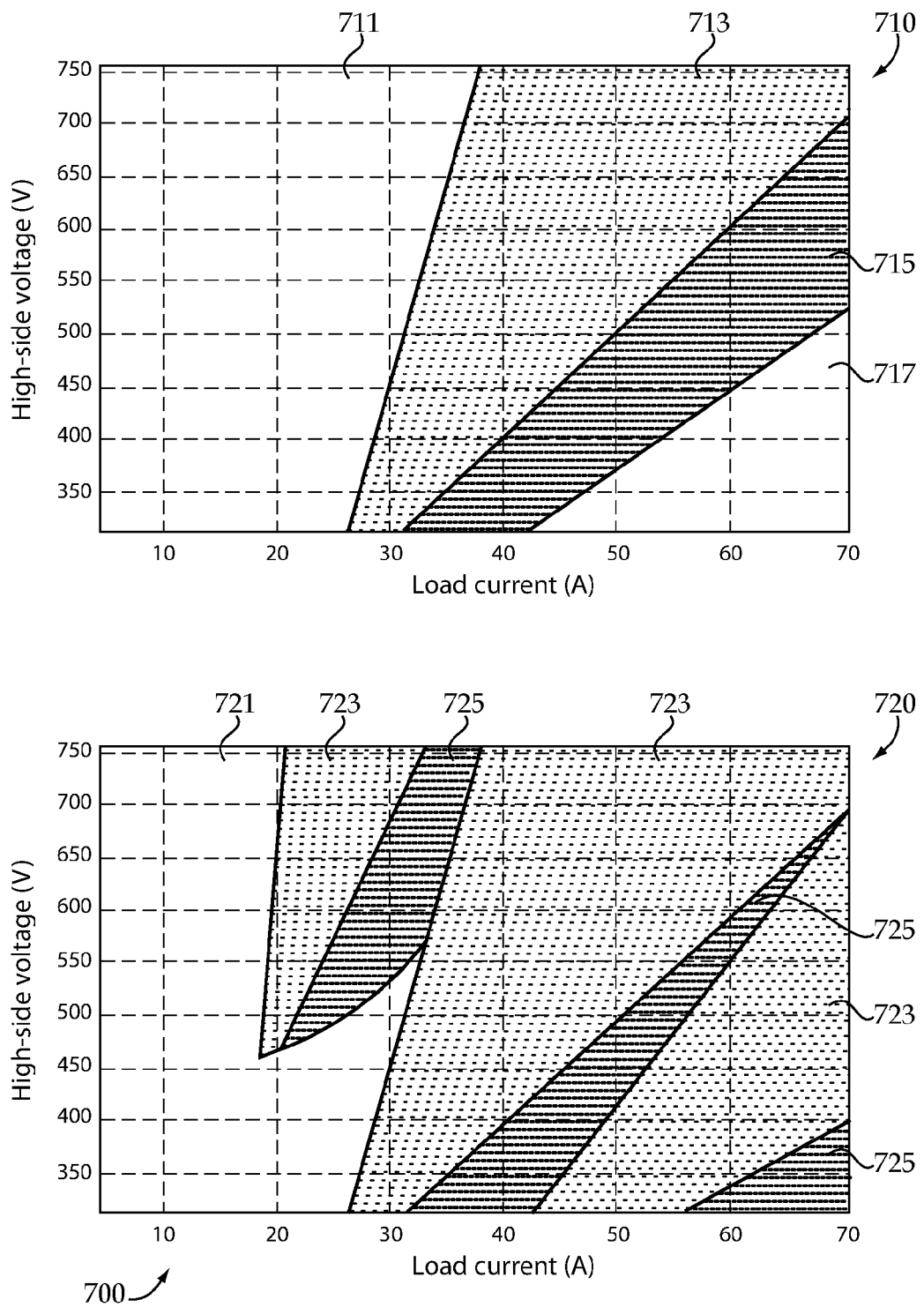
FIG. 7 is a plurality of graphs illustrating the resonant operating range of an exemplary resonant converter, such as the converters of FIGS. 1 and 6.

With reference to FIG. 7 there is illustrated a plurality of graph s 700 including graph 710 illustrating the operating range of a resonant converter with a fixed resonant tank. Graph 710 illustrates a hard switching operating range 711 where normal hard switching has a lower loss than the soft switching using resonance, such as in light load conditions; a resonant operating range 713 where soft switching using resonance reduces switching losses; a quasi-resonant operating range 715 where soft switching using resonance reduces switching losses, but there is reduced current turn-on due to operation limitations; and a hard switching operation range 717 where soft switching is not possible due to operational limitations.

Graph 720 illustrates the resonant operating range of a resonant converter with a variable resonant tank, such as the variable resonant tank of FIGS. 1 and 6. Graph 720 illustrates a hard switching operating range 721 where normal hard switching has a lower loss than the soft switching using resonance; a plurality of expanded resonant operating ranges 723 where soft switching using resonance reduces switching losses; and a plurality of quasi-resonant operating ranges 725 where soft switching using resonance reduces switching losses, but there is reduced current turn-on due to operation limitations.

Further written description of a number of exemplary embodiments shall now be provided. One embodiment is a system comprising a bidirectional resonant converter comprising an input/output terminal, a switching device coupled with the input/output terminal, a resonant circuit coupled with the switching device and including a variable inductor, an output/input terminal coupled with the resonant circuit, and a DC biasing circuit operatively coupled with the variable inductor; wherein the variable inductor comprises a toroidal core, a first winding wound around the toroidal core and coupled with the switching device and the output/input terminal, a second core structured to overlap a portion of the toroidal core, and a second winding wound around the second core and coupled with the DC biasing circuit; and wherein the DC biasing circuit is controllable to vary the inductance of the variable inductor by saturating a portion of the toroidal core with magnetic flux.

In certain forms of the foregoing system, the second core comprises a cylindrical portion positioned within the center of the toroidal core and top and bottom plate portions extending radially outward to overlap a portion of the toroidal core. In certain forms, the second core comprises a C-shaped structure including a top portion overlapping the toroidal core, a middle portion around which the second winding is would, and a third portion overlapping the toroidal core. In certain forms, the variable inductor comprises a third core structured to overlap a second portion of the toroidal core, and a third winding wound around the third core and coupled with a second DC biasing circuit, the second DC biasing circuit being controllable to vary the inductance of the variable inductor by saturating a second portion of the toroidal core with magnetic flux. In certain forms, a first flux path through the toroidal core for the first winding is generally toroidal and a second flux path through the toroidal core for the second winding is perpendicular to the first flux path. In certain forms, the toroidal core comprises an air gap positioned such that the air gap and the first winding overlap along a portion of the toroidal core.

Another exemplary embodiment is a variable inductor comprising a toroid comprising a first external surface; a first winding wound around at least a portion of the first external surface, the winding being coupled to an AC power source to generate AC flux in an AC flux path; a core comprising a second external surface; and a second winding wound around the second external surface of the core, coupled to a controller providing DC power to the second winding, and structured to generate DC flux in a DC flux path, the DC flux path passing through a portion of the toroid, wherein the presence of DC flux generated by the second winding alters an inductive value of the inductor.

In certain forms of the foregoing system, the core is structured to be selectively moveable relative to the toroid effective to selectively vary the portion of the toroid through which the DC flux passes. In certain forms, the controller is structured to selectively saturate the AC flux path by providing DC power to the second winding. In certain forms, the core comprises a cylinder with a first end and a second end, a top plate coupled to the first end of the core and in contact with the first external surface of the toroid, and a bottom plate coupled to the second end of the core and in contact with the first external surface of the toroid. In certain forms, the inductor comprises a second core having a cylinder with a third external surface, a first end, and a second end, a second DC winding wound around the third external surface of the cylinder of the second core, a second top plate coupled to the first end of the cylinder of the second core and in contact with the first external surface of the toroid, and a second bottom plate electrically coupled to the second end of the cylinder of the second core and in contact with the first external surface of the toroid. In certain forms, a portion of the core is encircled by the toroid. In certain forms, the toroid is structured as one of a torus with a circular cross section or a hollow square section ring with a rectangular cross section. In certain forms, the core comprises a C-core.

A further exemplary embodiment is A method comprising operating resonant converter circuitry including a first switching device operatively coupled with a first input/output terminal and a resonant tank, the resonant tank including a variable inductor, the variable inductor including a first core, a first winding wound around the first core and operatively coupled with the first switching device, a second core, and a second winding wound around the second core, a second switching device operatively coupled with the first winding of the resonant tank and a second input/output terminal, and an electronic control system operatively coupled with the first switching device and the second switching device and structure to control current to the second winding; operating the electronic control system to provide a current through the first winding of the variable inductor, provide a current through the second winding of the variable inductor so as to alter the inductance of the variable inductor, provide power to the second switching device from the resonant tank such that the voltage and current applied to second switching device by the resonant tank are with a current and voltage substantially equal to the current and voltage provided to the second switching device by the second input/output terminal, and open the second switching device during the zero-voltage, zero-current condition.

In certain forms of the foregoing method, the method comprises receiving voltage and load current requirements with the electronic control system; calculating with the electronic control system a desired resonant tank impedance using the voltage and load current requirements; and operating the electronic control system to provide a current to the second winding of the variable inductor with the electronic control system in response to the calculating the desired resonant tank impedance. In certain forms, the electronic control system is structured to operate the first switching device by opening and closing the switching device at resonant frequency so as to provide a resonant current to the second input/output terminal. In certain forms, the method comprises operating circuitry including a third winding wound around the second core and coupled with the electronic control system; calculating a change in resonant tank impedance using the voltage and load requirements; and providing a current to the third winding of the variable inductor in response to the calculating the desired resonant tank impedance. In certain forms, the electronic control system comprises a plurality of microprocessor based controllers. In certain forms, the resonant converter is structured and controlled to output AC power.

It is contemplated that the various aspects, features, processes, and operations from the various embodiments may be used in any of the other embodiments unless expressly stated to the contrary. Certain operations illustrated may be implemented by a computer executing a computer program product on a non-transient computer readable storage medium, where the computer program product includes instructions causing the computer to execute one or more of the operations, or to issue commands to other devices to execute one or more operations.

While the present disclosure has been illustrated and described in detail in the drawings and foregoing description, the same is to be considered as illustrative and not restrictive in character, it being understood that only certain exemplary embodiments have been shown and described and that all changes and modifications that come within the spirit of the present disclosure are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The terms "coupled to," "coupled with" and the like include indirect connection and coupling and further include but do not require a direct coupling or connection unless expressly indicated to the contrary. When the language "at least a portion" and/or "a portion" is used the item can include a portion and/or the entire item unless specifically stated to the contrary.

What is claimed is:

1. A system comprising:
a bidirectional resonant converter comprising an input/output terminal, a switching device coupled with the input/output terminal, a resonant circuit coupled with the switching device and including a variable inductor, an output/input terminal coupled with the resonant circuit, and a DC biasing circuit operatively coupled with the variable inductor;
wherein the variable inductor comprises a toroidal core, a first winding wound around the toroidal core and coupled with the switching device and the output/input terminal, a second core structured to overlap a portion of the toroidal core, and a second winding wound around the second core and coupled with the DC biasing circuit; and wherein the DC biasing circuit is controllable to vary an inductance of the variable inductor by saturating the portion of the toroidal core with magnetic flux.

2. The system of claim 1 wherein the second core comprises a cylindrical portion positioned within a center of the toroidal core and top and bottom plate portions extending radially outward to overlap the portion of the toroidal core.

3. The system of claim 1 wherein the second core comprises a C-shaped structure including a top portion overlapping the toroidal core, a middle portion around which the second winding is wound, and a third portion overlapping the toroidal core.

4. The system of claim 1 wherein the variable inductor comprises a third core structured to overlap a second portion of the toroidal core, and a third winding wound around the third core and coupled with a second DC biasing circuit, the second DC biasing circuit being controllable to vary the inductance of the variable inductor by saturating the second portion of the toroidal core with magnetic flux.

5. The system of claim 1 wherein a first flux path through the toroidal core for the first winding is toroidal and a second flux path through the toroidal core for the second winding is perpendicular to the first flux path.

6. The system of claim 1 wherein the toroidal core comprises an air gap positioned such that the air gap and the first winding overlap along the portion of the toroidal core.

7. A method comprising: operating resonant converter circuitry including a first switching device operatively coupled with a first input/output terminal and a resonant tank, the resonant tank including a variable inductor, the variable inductor including a first core, a first winding wound around the first core and operatively coupled with the first switching device, a second core, and a second winding wound around the second core, a second switching device operatively coupled with the first winding of the variable inductor and a second input/output terminal, and an electronic control system operatively coupled with the first switching device and the second switching device and structured to control current to the second winding; operating the electronic control system to provide a current through the first winding of the variable inductor, provide a current through the second winding of the variable inductor so as to alter an inductance of the variable inductor, provide power to the second switching device from the resonant tank such that a voltage and current applied to the second switching device by the resonant tank are substantially equal to a current and voltage provided to the second switching device by the second input/output terminal, and open the second switching device during a zero-voltage, zero-current condition.

8. The method of claim 7 comprising:
receiving voltage and load current requirements with the electronic control system;
calculating with the electronic control system a desired resonant tank impedance using the voltage and load current requirements; and
operating the electronic control system to provide a current to the second winding of the variable inductor with the electronic control system in response to the calculating of the desired resonant tank impedance.

9. The method of claim 8 wherein the electronic control system is structured to operate the first switching device by opening and closing the first switching device at resonant frequency so as to provide a resonant current to the second input/output terminal.

10. The method of claim 9 comprising:
operating circuitry including a third winding wound around the second core and coupled with the electronic control system;
calculating a change in resonant tank impedance using the voltage and load requirements; and
providing a current to the third winding of the variable inductor in response to the calculating of the desired resonant tank impedance.

11. The method of claim 7 wherein the electronic control system comprises a plurality of microprocessor based controllers.

12. The method of claim 7 wherein the resonant converter is structured and controlled to output AC power.

\* \* \* \* \*